United States Patent Office 3,509,207
Patented Apr. 28, 1970

3,509,207
THERAPEUTICALLY ACTIVE DERIVATIVES OF p-DIHYDROXYBENZENE
Antonio Esteve-Subirana, Barcelona, Spain, assignor to Laboratories Om Societe Anonyme, Geneva, Switzerland, a company of Switzerland
No Drawing. Continuation-in-part of application Ser. No. 202,981, June 18, 1962. This application Dec. 12, 1966, Ser. No. 600,721
Claims priority, application Switzerland, Jan. 20, 1966, 769/66
The portion of the term of the patent subsequent to Nov. 21, 1984, has been disclaimed
Int. Cl. C07c *143/42*
U.S. Cl. 260—512    1 Claim

ABSTRACT OF THE DISCLOSURE

Compounds useful in the therapy of blood coagulation, particularly for dimmishing the time of blood coagulation, namely, hydroquinone ammonium sulfonate and hydroquinone calcium sulfonate.

---

This application is a continuation-in-part of application Ser. No. 202,981, filed June 18, 1962, now Patent No. 3,354,201, the latter of which is a continuation-in-part of application Ser. No. 2, filed Jan. 4, 1960, and now abandoned.

The present invention concerns therapeutically active sulfonates of hydroquinone.

During pharmacological tests of a series of hydroquinone sulfonates, it has been found that the compounds of the following formulas

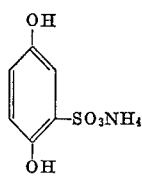

and

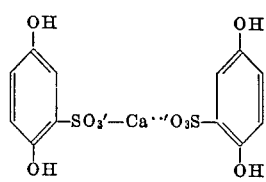

i.e. hydroquinone ammonium sulfonate and hydroquinone calcuim sulfonate, are especially useful in the therapy of blood coagulation, particularly for diminishing the time of blood coagulation.

According to the invention, these compounds are manufactured by reaction 1,4-benzoquinone with ammonium or calcium bisulfite respectively.

EXAMPLE 1

Manufacture of hydroquinone ammonium sulfonate

To an alcoholic solution of 108 g. 1,4-benzoquinone are added 99 g. of pure ammonium bisulfite dissloved in distilled water in an amount sufficient to obtain a saturated solution at 0° C. The addition is made slowly under stirring and cooling. After the addition, the stirring is continued for one hour, whereby the solution is concentrated until the volume is sufficiently reduced for the crystalization to begin. By cooling, one obtains 120 g. of hydroquinone ammonium sulfonate. Melting point 204° C.

The obtained product consists of small colorless crystals, which are easily soluble in water and alcohol, and insoluble in ether.

Its toxicity $DL_{50}$ for the rat is 1200 mg./kg.

The following table shows the results of the anti-hemorrhagic activity determined according to Roskam's method on the rabbit ear, after intravenous injection of 2 mg./kg.

MEAN BLEEDING TIME

| Rabbit | Weight (g.) | Initial | After 1 hour | percent inhibition |
|---|---|---|---|---|
| 1 | 2.050 | 210″ | 139″ | 34 |
| 2 | 2.250 | 244″ | 146″ | 41 |
| 3 | 2.050 | 220″ | 142″ | 36 |
| 4 | 2.300 | 254″ | 184″ | 28 |

EXAMPLE 2

Manufacture of hydroquinone calcium sulfonate

To an ether solution of 108 g. 1,4-benzoquinone, maintained below 0° C., one adds an also very cold solution of 102 g. of pure calcium bisulfite as a 50% solution in distilled water. The addition is made carefully so as to maintain a very low temperature (0 to 4° C). in the vessel, and under stirring so as to mix the water and ether phase.

At the end of the addition, an almost colorless ether layer swims on the surface of the strongly colored water layer. After removal of the ether layer, the water layer is concentrated to dryness under vacuum and a stream of an inert gas. An earthy precipitate is formed, which after recrystallization yields 100 g. of hydroquinone calcium sulfonate, which decomposes without melting above 250° C.

The product consists of very small crystals having a powdery aspect and a pink color which deepens on contact with air. This product is very soluble in water and alcohol, and insoluble in ether.

Its toxicity $DL_{50}$ for the mouse is 700 mg./kg.

The following table contains the values for the antihemmorrhagic activity determined according to Roskam's method on the rabbit ear, after intravenous injection of 2.5 mg./kg.

MEAN BLEEDING TIME

| Rabbit | Weight (g.) | Initial | After 1 hour | Percent inhibition |
|---|---|---|---|---|
| 1 | 2.800 | 251″ | 154″ | 39 |
| 2 | 2.350 | 241″ | 145″ | 40 |
| 3 | 2.500 | 264″ | 159″ | 40 |
| 4 | 2.400 | 304″ | 190″ | 39 |

Hydroquinone ammonium or calcium sulfonate can be administered:

parenterally: intravenous or intramuscular injection of doses of 250 or 500 mg., which can be repeated each 4 or 6 hours;

orally: 2–8 tablets each containing 250 mg., during 24 hours;

rectally: 2–4 suppositories, each containing 500 mg., during 24 hours.

For children, one half of these amounts is used.

An injectable solution consists of:

Hydroquinone ammonium or calcium sulfonate—0.250 g.
Distilled water—q.s.p. 2 ml.

Tablets consist of:

| | G. |
|---|---|
| Hydroquinone ammonium or calcium sulfonate | 0.250 |
| Excipient | Q.s.p. 0.400 |

Suppositories consist of:

| | G. |
|---|---|
| Hydroquinone ammonium or calcium sulfonate | 0.500 |
| Excipient | Q.s.p. 2.300 |

What is claimed is:
1. Compounds of the class consisting of hydroquinone ammonium sulfonate and hydroquinone calcium sulfonate, of the formulae:

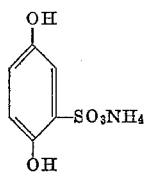

and

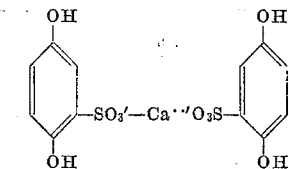

References Cited

UNITED STATES PATENTS
3,354,201  11/1967  Subirana _____ 210—501.21

FOREIGN PATENTS
771,180  3/1957  Great Britain.

OTHER REFERENCES
Ablondi et al., J. Am. Chem. Soc. 65 1776 (1943).
OM Soc. Anon., Chemical Abstracts 58, 3332b (1963).
OM Soc. Anon., Chemical Abstracts 61, 427g (1964).

DANIEL D. HORWITZ, Primary Examiner

U.S. Cl. X.R.
424—335